Patented Aug. 29, 1950

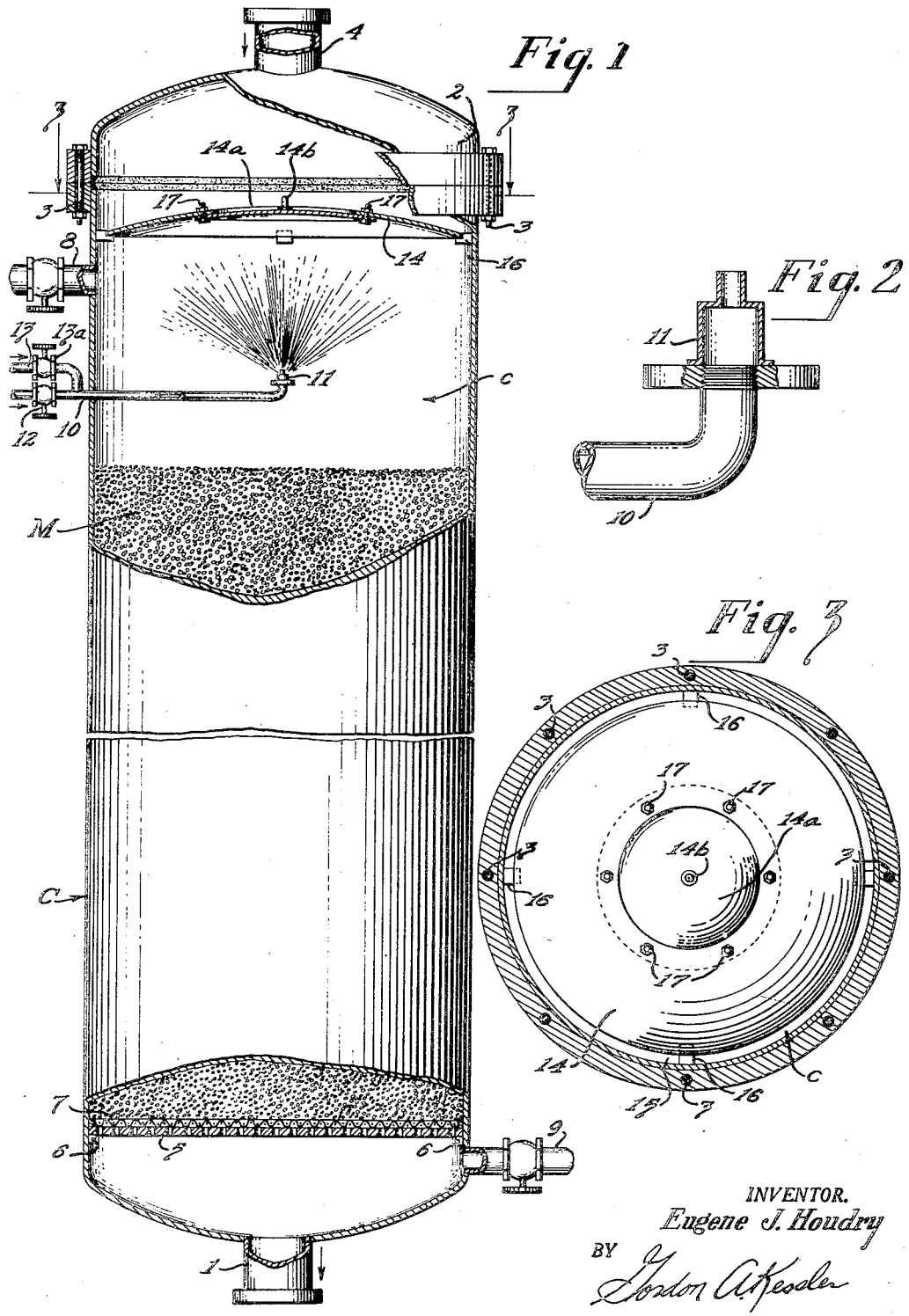

2,520,146

UNITED STATES PATENT OFFICE 2,520,146

ART OF PRODUCING HYDROCARBON VAPORS

Eugene J. Houdry, Ardmore, Pa., assignor to Houdry Process Corporation, Wilmington, Del., a corporation of Delaware Application August 6, 1947, Serial No. 766,575

8 Claims. (Cl. 196—52)

My invention relates to improved features in the art of producing hydrocarbon vapors.

It is known that liquid phase hydrocarbon material may be engaged with a mass of suitable contact material having elevated temperature in order to produce converted products in the vapor phase. More particularly, it is known that a vaporizing and viscosity-breaking operation is effected when the aforesaid contact material is substantially inert catalytically and when the hydrocarbon material which is engaged therewith is of "heavy" character such, for example, as entire crudes, reduced or topped crudes, crude bottoms, residual or heavy bottoms, distillation residuums, etc., all of which contain heavy, difficultly vaporizable fractions or components such as tar, asphalt or the like in various proportions.

As regards a process of the general character referred to above, improved results are obtained, in accordance with my invention, by maintaining conditions such that the liquid phase hydrocarbon material is applied to the top surface of the contact mass whether fixed bed or moving bed, preferably the former, approximately in uniform manner or in an improved uniform manner. To this end, a mass of suitable contact material is disposed within a housing beneath an upper zone or chamber into which a stream of vapors passes continuously. In suitable manner, as hereinafter described, the vapors, during passage thereof through said zone, are caused to have a condition of substantial turbulence and, as this condition continues or persists, atomized liquid hydrocarbon material is injected into the turbulent area of said zone to produce a turbulent suspension wherein the atomized liquid material is substantially uniformly distributed in the vapors which thereafter carry such atomized liquid material into engagement with and distribute it substantially uniformly or in a desired uniform manner on said top surface of the contact mass.

More particularly, as regards one form of the invention, a baffle plate, or equivalent, is disposed adjacent the top of the aforesaid zone or chamber to provide a restricted passage traversed by the vapors with resultant substantial increase in velocity thereof whereby a marked condition of turbulence of a suspension comprising vapors and atomized liquid material is induced in the zone of turbulence beneath said baffle plate. As a result, improvement is effected as regards uniform distribution of the atomized liquid material on said top surface of the contact mass.

In accordance with one specific phase of the invention, the aforesaid atomized liquid material is directed upwardly through the described zone approximately counter-current as regards the descending vapors which have velocity and are in quantity sufficient to suspend the atomized liquid material and carry it into engagement with the top surface of said contact mass as and for the purpose stated.

Various other objects and advantages of my invention will become apparent from the following detailed description.

My invention resides in the method, apparatus and improved features of the character hereinafter described and claimed.

For an understanding of my invention and for an illustration of one of the many forms of apparatus utilizable for practicing the invention, reference is to be had to the accompanying drawing, in which:

Figure 1 is an elevational view, partly in section, showing a converter as constructed in accordance with the invention;

Figure 2 is a fragmentary, enlarged sectional view showing an atomizer; and

Figure 3 is a transverse sectional view taken on the line 3—3 of Figure 1.

In the following detailed description, I have explained a present preferred application of my invention relating to a vaporizer for heavy hydrocarbon material. However, the invention is not to be thus limited except as recited in the appended claims.

Accordingly, referring to Figure 1, I have shown a vaporizer for liquid hydrocarbon material which may comprise a vertical housing, casing or shell C which may be circular in horizontal section, said casing C having a lower valve-controlled discharge passage 1 adapted to be traversed by vaporized products. The casing C may comprise a detachable head 2 suitably secured to the lower casing portion in flanged relation, as by bolts 3, said head 2 comprising an upper valve-controlled inlet passage 4 adapted to be traversed by hot vapors.

Disposed within the casing C is a contact mass M formed from suitable contact material which is substantially inert in a catalytic sense. The contact mass M may be supported by a perforated plate or grid 5, the lower surface of which may engage a plurality of members 6 carried by the interior surface of the casing C. Disposed in engagement with the upper surface of the plate 5 is a screen or grid 7 utilizable for preventing passage of the aforesaid contact material downwardly through the perforations of said plate 5.

Any suitable arrangement may be provided for passing a regenerating medium in either direction through the contact mass M to burn carbonaceous material therefrom after each on-stream period. To this end and as diagrammatically indicated, valve-controlled conduits 8 and 9 may communicate with the casing C above and below the aforesaid contact mass. Or, in known manner, the conduits 1 and 4 may be utilized for this purpose.

In the manner hereinafter described, the casing C defines a vaporizing and viscosity-breaking zone for the atomized liquid portion of the hydrocarbon charge material which engages and passes into the contact mass M. The latter may be formed from pieces of any suitable substantially inert contact material such, for example, as fused alumina (Alundum), fused silica and alumina, heat-resistant quartz or quartz pebbles, fused silica, etc. In my U. S. Letters Patent No. 2,414,812, there is description relating to the heat-absorbing capacity, density and other physical qualities of preferred inert contact material. The aforesaid pieces of contact material may have approximately uniform surface area and volume. They may be of any suitable shape and the size thereof may be selected as desired. If desired, they may have approximately spherical or chunk-like configuration and the major dimensions thereof may range between ¼ to ¾ of an inch, for example.

Above the top surface of the contact mass M, the casing C defines a zone or chamber c having adequate height for the development of the hereinafter described turbulent condition of the composite mixture formed from the vapors traversing the conduit 4 and the hereinafter described atomized liquid material.

A pipe or conduit 10 extends into the zone c closely adjacent the top surface of the contact mass M and terminates in an atomizer or nozzle 11 which, in accordance with one embodiment of the invention, is so constructed and arranged that it discharges atomized liquid hydrocarbon material upwardly as hereinafter more particularly described. The atomizer 11 may be of any suitable character. For example, it may comprise a single or a plurality of upwardly facing discharge ports or passages. The pipe 10 should be controlled by a valve 12 and, in accordance with a detailed feature of the invention, another pipe or conduit 13 communicates with said pipe 10, the pipe 13 being controlled by a valve 13a and being utilizable as hereinafter described.

In accordance with the invention, a baffle plate or deflecting member 14 is disposed interiorly of the zone c a substantial distance above the atomizer 11. Preferably, the baffle plate 14 has convex configuration and it should be positioned interiorly of said casing C as shown in Figure 1. The diameter or transverse dimension of the baffle plate 14 should be suitably less and preferably only slightly less than that of the internal diameter of the casing C so that it, together with said casing C, defines a restricted annular passage 15, Figure 3, which, preferably has uniform width throughout the circular length thereof. The baffle plate 14 may be supported in its intended position in any suitable manner, as by a plurality of spaced casing-carried supports 16 to which said baffle plate 14 may be welded or otherwise suitably secured. Preferably, but by no means necessarily, the baffle plate 14 may comprise a suitably located detachable portion 14a having a handle 14b, bolts 17, or equivalent, being utilized to secure said portion 14a to the other baffle plate portion.

In the event that the configuration of the casing C is otherwise than circular in horizontal section, it will be understood that the shape of the above described baffle plate should be selected so as to provide a passage around the exterior surface thereof having uniform width throughout the length thereof.

During a regenerating period, the valves, not shown, of the conduits 1 and 4 are closed and the same holds true as regards the valves 12 and 13a. After these valves have been closed, air or other suitable regenerating medium having known or desired temperature is passed in either direction through the contact mass M by way of the pipes 8 and 10 to burn previously deposited carbonaceous material from the contact material with consequent elevation in temperature thereof. At the conclusion of the regenerating period, the contact material has suitable bed temperature ranging at different respective levels between 800° F. and 1250° F., for example. In this connection, it should be noted that regeneration of a bed of contact material as described above usually causes the bed temperature to have maximum value at some level within the bed.

Assuming that the valve 13a together with the valves of the respective pipes 8 and 9 are closed, the on-stream period is initiated while the contact material has elevated bed temperature as described immediately above by opening the valves of the respective conduits 1 and 4 together with the valve 12. In thus initiating the on-stream period, hydrocarbon liquid material is passed through the pipe 10 and then through the atomizer 11 with resultant production of a diverging stream of upwardly moving atomized liquid hydrocarbon material. Simultaneously, a stream of vapors is admitted to the casing C by way of the conduit 4, these vapors engaging the baffle plate 14 and being deflected thereby so as to pass through the annular passage 15 and then downwardly through the upper part of said casing C. in counter-current relation as regards the aforesaid upwardly moving stream of atomized hydrocarbon mixture.

The hydrocarbon material which is admitted to the casing chamber C by way of the pipe 10 should be "heavy" as hereinbefore described and it may be entirely in the liquid phase or partly liquid to desired extent together with a supply of vapors which may be hydrocarbon vapors, steam or equivalent. The temperature of the hydrocarbon material or the mixture including hydrocarbon material traversing the pipe 10 may be such as is suitable or desirable. If not free-flowing, it should be heated at least to sufficient extent to cause it to be in this condition. As regards higher temperature, the admitted hydrocarbon material may be heated in a range extending upwardly to 750° F. or higher although the extent of such temperature elevation should not be sufficient to produce any substantial amount either of lower boiling hydrocarbons of the gasoline type or of carbonaceous material in the heating equipment. The pressure of the hydrocarbon material traversing the conduit 10 should be sufficient to cause the atomized liquid hydrocarbon material, after ejection from the atomizer 11, to have velocity sufficient to elevate it to substantial extent toward the baffle plate 14 but not substantially into engagement therewith.

The stream of vapors last named may be of any suitable character such, for example, as hydrocarbon vapors derived from any suitable source, steam, or equivalent, or a mixture of these materials. The temperature of these vapors should be at least as high and preferably substantially higher, as 100° F. to 200° F. higher, than the temperature of the hydrocarbon material traversing the pipe 10. However, as will be understood, the temperature of these vapors, if hydrocarbon vapors heavier than gasoline, should not be high enough to cause any substantial cracking thereof into lower boiling hydrocarbons of the gasoline type within the time of their residence in the zone c. In accordance with the invention, the velocity and quantity of the aforesaid vapors should be sufficient to form a uniform suspension of the atomized liquid and to carry the same downwardly into engagement with the top surface of the contact mass while retaining the suspension in atomized condition.

In accordance with the invention, the vapors admitted to the housing C by way of the inlet passage 4 are caused to have a condition of substantial turbulence during passage thereof through the zone c. In the form of the invention herein illustrated, although not necessarily, this condition of turbulence is induced by reason of the fact that the velocity of the vapors is increased to substantial extent as they pass through the annular passage 15, the vapors thereafter passing into the zone c where the swirling or turbulent condition thereof is established and maintained. As regards a broad aspect of the invention, it shall be understood that any equivalent arrangement other than the baffle plate 14 may be utilized to induce a condition of substantial vapor turbulence in the zone c.

As the operation proceeds, the atomized liquid material hereinbefore described is injected into the turbulent area of the zone c whereby, resulting from the condition of turbulence, there is produced a suspension or composite mixture wherein said atomized liquid material is distributed, substantially uniformly, in the vapors, the latter carrying such atomized liquid material into engagement with and distributing it in a desired uniform manner on the top surface of the contact mass M. It is desirable for the atomized liquid hydrocarbon material to be distributed substantially or approximately uniformly on the top bed surface as described above because this insures generally similar uniform engagement of such atomized material with the pieces of contact material as said atomized material moves downwardly in engagement therewith. When this condition obtains, there is substantially uniform utilization of the contact surfaces and the heat content of the contact mass in effecting the vaporization. Hence, vaporization of the atomized liquid material occurs substantially uniformly throughout at least a substantial portion of the bed area with resultant substantially uniform deposition of carbonaceous material, the latter being desirable because insuring the development of a substantially uniform temperature condition transversely of the bed during regeneration, this condition persisting during the succeeding on-stream period. More particularly, when the atomized liquid hydrocarbon material is distributed substantially uniformly on the top bed surface as stated, the formation, during regeneration, of localized hot columns in the contact material is substantially prevented. This, as will be understood, is advantageous.

After initiation of the on-stream period, the operation proceeds as described above with continuous deposition, on the top contact mass surface, of atomized liquid hydrocarbon material which continuously passes downwardly in engagement with the inert material forming said contact mass. Resulting from this operation, the difficultly vaporizable components of such atomized liquid hydrocarbon material are effectively vaporized and viscosity-broken whereby there is formed distillate hydrocarbon material which is principally higher boiling than gasoline, this material passing from the casing C by way of the conduit 1. In order to minimize the production of lower boiling hydrocarbons of the gasoline type when desired, the contact time of the hydrocarbon vapors with the contact material, as determined by known factors, should be maintained at a desired low magnitude as, for example, 15 seconds or less.

The on-stream period may be continued, accompanied by formation of distillate hydrocarbon material as described above, as long as the temperature of the contact mass M is within a range which is effective as regards vaporization and viscosity-breaking of the difficultly vaporizable hydrocarbon material. When the temperature of the contact mass M reaches (or approaches to a desired extent) the lower level of the aforesaid range, the supply of material passing into the casing C by way of the conduit 4 and the pipe 10 is discontinued and this terminates the on-stream period.

When the temperature conditions are proper, the vapors admitted to the casing C by way of the conduit 4 rapidly vaporize, in the chamber c, a part of the higher boiling components of the hydrocarbon material admitted to said chamber by way of the pipe 10. This is desirable because decreasing the amount of atomized liquid material which engages the top surface of the contact mass thus minimizing the adverse effect of such non-uniform distribution of atomized liquid material on the top contact mass surfaces as may exist. In addition, the aforesaid vapors are effective as regards decrease of the aforesaid vapor contact time factor, this being desirable for the reason referred to above.

For purposes of explanation and without limitation of the invention, the following example is included as a part of this specification.

The converter shell for the contact mass had a diameter of fifty-four (54) inches. In the upper portion of it, an inverted dished cylindrical baffle forty-eight (48) inches in diameter was deposited concentrically with the converter shell. There was admitted to an atomizing nozzle located below the baffle and discharging upwardly toward it reduced crude of 23.4° A. P. I. gravity which had been preheated to 815° F. at a rate of 21 gallons per minute. Simultaneously, hydrocarbon vapor of about 130 molecular weight was admitted in vapor phase in a chamber above the baffle at temperature of about 900° F. The rate of feed of this vapor stream was 30 gallons per minute (liquid basis). The pressure within the vaporizer was 30 lbs. per square inch. Under these conditions the ratio of vapor feed at the conditions of temperature and pressure within the atomizing and mixing chamber or zone was about 220 cubic feet per each cubic foot of liquid feed admitted to the atomizing nozzle.

The resulting suspension of atomizing liquid in hot vapor passed through the inert contact mass, which aggregated 3500 liters of fused silica and alumina in volume, for a 10 minute operating period. During this period, the temperature of the mass at or near its upper surface ranged from 900° F. to 800° F. At its lower end, or outlet, the temperatures ranged from about 1000° F. to 900° F. In the intermediate portions, the temperatures were above 850° F., the maximum being approximately 1100° F.

Comparison of the properties of charge and product is as follows:

| Inspections | Charge | Products (After removal of the light hydrocarbon feed) |
|---|---|---|
| °A. P. I. | 23.4 | 25.1 |
| Distillation: | | |
| 5% | 598 | |
| 10% | 676 | 527 |
| 50% | 854 | 705 |
| 90% | | 939 |
| End Point | 973 @ 73% | 973 @ 94% |
| Salt, lbs./1000 bbls | 57.5 | 3.2 |
| Conradson Carbon Wt. Per Cent | 3.68 | 0.90 |
| Dew Point (Atmospheric Pressure) | 1,000+ | 885 |

In the specific example referred to above, it was stated that, under the conditions specified, the ratio of vapor feed was about 220 cubic feet per each cubic foot of liquid feed admitted to the atomizing nozzle. The development of a satisfactory condition of turbulence may be obtained in the zone c, however, if under the conditions specified, the ratio of vapor feed is at least approximately 100 cubic feet per each cubic foot of liquid feed admitted to said atomizing nozzle.

The specific description forming the preceding part of this specification relates to the use of inert contact material for vaporizing and viscosity-breaking heavy hydrocarbon which is passed into the aforesaid turbulent zone c while at least partially in the liquid phase. However, the invention is not to be thus limited.

Thus, the contact material C may be catalytic in character such, for example, as activated clay pellets, or synthetic silica-alumina pellets or beads, etc. having suitable major dimensions such as between 1/16 and 3/4 of an inch. Other suitable catalysts for cracking include synthetic plural oxide composites, silicious or non-silicious in character and containing, for example, zirconia, alumina or beryllia.

When the conversion operation is catalytic in character, the contact mass M may be formed from catalytic contact material of the character described above and the temperature thereof, after regeneration has been completed, may range between 800° F. and 1000° F. The vapors admitted to the casing C by way of the inlet passage 4 may have quality, quantity and temperature characteristics as hereinbefore described. Hydrocarbon material such, for example, as a suitable residual stock, topped or reduced crude is supplied to the pipe 10, while at least partially in the liquid phase and while having suitable elevated temperature as, for example, from 600° F. to 700° F., the liquid phase portion of this material being atomized by the nozzle 11 and projected upwardly into the zone c in the manner hereinbefore described. Resulting from this operation and from the condition of turbulence existing in said zone c, the atomized liquid material is suspended substantially uniformly in the vapors and distributed thereby in the desired uniform manner on the top surface of the contact mass M whereupon the catalytic conversion operation proceeds in an obvious manner.

While the preceding detailed description relates to upward ejection of the atomized liquid material into the turbulent zone c, it shall be understood that the invention is not to be thus limited. Thus, while obtaining the desirable results of the invention, the direction of ejection of said atomized liquid material into the zone c may be downward, horizontal or otherwise as may be desired and, further, in lieu of the atomizer 11, any other suitable atomizing arrangement may be utilized as desired.

It was hereinbefore stated, that, if desired, the baffle plate 14 may comprise a detachable portion 14a. When the arrangement is of this character, the casing head 2 may be removed and thereafter said baffle plate portion 14a may be detached from the other baffle plate portion. When this had been done, an operator may enter the chamber above the contact mass M for inspection or repair purposes.

As hereinbefore stated, a principal object of the invention relates to the deposition of the atomized liquid material on the top surface of the contact mass M substantially in a uniform manner. To this end, in the form of the invention herein shown, it is desirable, although not essential, that the longitudinal or vertical axis of the conduit 4 and the atomizer 11 should be in substantial coincidence with the longitudinal or vertical axis of the casing C. Likewise, this same condition should obtain as regards the annular passage 15 which, as stated, is defined in part by the baffle plate 14.

In accordance with a detailed feature of the invention, hydrocarbon material is removed from that portion of the pipe 10 which is disposed within the casing C after the termination of each on-stream period and, preferably, before initiation of the succeeding regenerating period. Thus, the valve 12 controlling the admission of hydrocarbon material to the zone c is closed at the termination of each on-stream period. Immediately thereafter, the valve 13a may be opened to permit steam, flue gases or other purging medium (which is available under suitable pressure in the pipe 13) to traverse said portion of the pipe 10 to thereby expel from said pipe portion and into the zone c the hydrocarbon material remaining therein at the end of the on-stream period. In the absence of an operation of this character, undesired formation of carbonaceous material in said pipe portion 10 would occur during each regenerating period. Obviously, the operation last described may be otherwise performed, for example, by the application of a vacuum condition to said portion of the pipe within the zone c to withdraw hydrocarbon material therefrom.

Obviously many modifications and variations of the invention as hereinbefore set forth may be made without departing from the spirit and scope thereof and, therefore, only such limitations should be imposed as are indicated in the appended claims.

I claim as my invention:

1. In a process for the conversion of liquid hydrocarbon material by contacting said liquid hydrocarbon material with a granular contact mass under conversion conditions, the method of contacting said contact mass with atomized particles of said hydrocarbon material uniformly suspended in a stream of vapor which comprises flowing said stream of vapors into a vapor-liquid mixing zone located directly above the upper surface of said contact mass and substantially horizontally coextensive therewith past an obstruction to flow of substantial continuous horizontal extent located directly above said vapor-liquid mixing zone and thereby creating a turbulent swirling mass of said vapor immediately beneath and contiguous to said obstruction to flow, injecting atomized liquid hydrocarbon material upwardly into said turbulent swirling mass of vapor so as to form a suspension of atomized particles of said liquid hydrocarbon material uniformly distributed throughout said turbulent mass of vapor, passing said suspension downwardly through the upper surface of said contact mass and removing vapor comprising vaporous conversion products of said liquid hydrocarbon material from said contact mass.

2. In a process for the conversion of liquid hydrocarbon material by contacting said liquid hydrocarbon material with a granular contact mass under conversion conditions, the method of contacting said contact mass with atomized particles of said hydrocarbon material uniformly suspended in a stream of vapor which comprises introducing a turbulent swirling stream of vapor peripherally at the top of a vapor-liquid mixing zone located directly above the upper surface of said contact mass, forming a suspension of atomized particles of said liquid hydrocarbon material uniformly distributed throughout said turbulent stream of vapor by directing atomized liquid hydrocarbon material upwardly into said turbulent stream of vapor in said vapor-liquid mixing zone, passing said suspension downwardly through the upper surface of said contact mass and removing vapor comprising vaporous conversion products of said liquid hydrocarbon material from said contact mass.

3. The method of claim 2 wherein the contact mass is substantially inert catalytically and the liquid hydrocarbon material comprises heavy difficultly vaporizable fractions.

4. The method of claim 2 wherein said vapor is steam.

5. The method of claim 2 wherein the contact mass comprises a hydrocarbon conversion catalyst and the liquid material comprises heavy difficultly vaporizable fractions.

6. The method of claim 2 wherein the contact mass is a static bed subjected alternately to periods of hydrocarbon conversion and periods of regeneration.

7. The method of claim 2 wherein the ratio of the amount of vapor to the amount of liquid hydrocarbon material is in the range of about 100 to 220 cubic feet of vapor per cubic foot of liquid hydrocarbon material.

8. In a vaporizer, a vertical casing which is circular in horizontal section, a contact mass disposed within said casing beneath an upper casing chamber, an inlet conduit at the top of said casing for admission thereto of a stream of vapors, a circular baffle plate adjacent the top of said chamber and forming with the interior surface of said casing a restricted annular passage having substantially uniform width throughout the circular length thereof, said baffle plate comprising a detachable portion which, when detached, permits access to the portion of said chamber below said baffle plate, and a pipe extending into said chamber and terminating in an atomizer adapted to direct atomized liquid material upwardly, the vertical axis of conduit, said annular passage and said atomizer coinciding substantially with the vertical axis of said casing.

EUGENE J. HOUDRY.

REFERENCES CITED

The following references are of record in the file of this patent:

UNITED STATES PATENTS

| Number | Name | Date |
|---|---|---|
| 911,869 | Doherty | Feb. 9, 1909 |
| 1,505,870 | Culmer | Aug. 19, 1924 |
| 1,714,198 | Wallace | May 21, 1929 |
| 2,173,844 | Houdry | Sept. 26, 1939 |
| 2,319,620 | Mather | May 18, 1943 |
| 2,380,391 | Bates | July 31, 1945 |
| 2,429,545 | Bergstrom | Oct. 21, 1947 |